United States Patent [19]

Yoshioka et al.

[11] Patent Number: 4,553,169

[45] Date of Patent: Nov. 12, 1985

[54] CLAMP CIRCUIT FOR USE IN VIDEO CAMERA HAVING IMAGE PICK-UP DEVICE

[75] Inventors: Osamu Yoshioka; Isao Kajino, both of Kanagawa; Seisuke Yamanaka, Tokyo, all of Japan

[73] Assignee: Sony Corporation, Tokyo, Japan

[21] Appl. No.: 564,029

[22] Filed: Dec. 21, 1983

[30] Foreign Application Priority Data

Dec. 29, 1982 [JP] Japan ................................ 57-234233

[51] Int. Cl.⁴ .............................................. H04N 5/30
[52] U.S. Cl. .................................... 358/221; 358/209; 358/212
[58] Field of Search ............... 358/221, 222, 213, 209, 358/212, 227; 250/578; 357/24 LR

[56] References Cited

U.S. PATENT DOCUMENTS

| | | | |
|---|---|---|---|
| 3,898,379 | 8/1975 | Howe et al. | 358/222 |
| 3,949,162 | 4/1976 | Malueg | 358/221 |
| 4,001,502 | 1/1977 | van Roessel | 358/165 |
| 4,232,331 | 11/1980 | Motoyama et al. | 358/44 |
| 4,293,877 | 10/1981 | Tsunekawa et al. | 358/213 |

FOREIGN PATENT DOCUMENTS

| | | | |
|---|---|---|---|
| 53-123617 | 10/1978 | Japan | 358/221 |
| 53-125718 | 11/1978 | Japan | 358/221 |

Primary Examiner—Gene Z. Rubinson
Assistant Examiner—Robert Lev
Attorney, Agent, or Firm—Hill, Van Santen, Steadman & Simpson

[57] ABSTRACT

A clamp circuit is disclosed, which clamps the black level of output signal of an image pick-up section with an optical black-detecting portion in the horizontal direction provided in an ineffective picture area corresponding to the horizontal blanking interval of the output signal of the section for each horizontal scanning interval. The pulse width at least one clamp pulse immediately after the vertical blanking interval is made greater than that of the other clamp pulses, within the horizontal blanking interval.

6 Claims, 6 Drawing Figures

CLAMP CIRCUIT FOR USE IN VIDEO CAMERA HAVING IMAGE PICK-UP DEVICE

BACKGROUND OF THE INVENTION

1. Field of the Invention

This invention relates to a clamp circuit for use in an image pick-up device of a video camera or the like to clamp the black level of the output signal of the image pick-up to a predetermined electrical potential and, more particularly, to a clamp circuit, which clamps the optical black level signal of the output of an image pick-up. Clamping is accomplished in an ineffective picture area corresponding to the horizontal blanking interval for each horizontal scanning interval.

The output signal obtained from an image pick-up device is usually subjected to various signal processing with its black level as a reference. Meanwhile, it is well-known in the art that an image pick-up tube or a solid-state image sensor, which is used as the image pick-up section of the image pick-up device, is subject to dark current fluctuations due to causes such as ambient temperature changes. The dark current fluctuations cause variations of the output signal level.

To cope with this drawback, it has been proposed to provide the image pick-up section 1, as shown in FIG. 1, with an optical black-detecting portion 4 which is shielded on, a horizontal side against light in an ineffective picture area 3 surrounding an effective picture area 2 which corresponds to the horizontal blanking interval of the output signal of the image pickup section 1. It has also been proposed to clamp the optical black level of the image pick-up output signal to a predetermined electrical potential. The output signal of the image pick-up section 1 with the optical black-detecting portion 4, as shown in FIG. 2A, has a signal interval $TH_D$ which corresponds to the optical black-detecting portion 4. The signal interval $TH_D$ is within the horizontal blanking interval $TH_{BLK}$ of the horizontal scanning interval H. The signal level of the signal interval $TH_D$ depends on the optical black-detecting portion 4, which is shielded from light. That is, it does not depend on the image pick-up light intensity but is determined by the level of the dark current. Compensation of said optical black level for dark current fluctuations, therefore, can be obtained to maintain a predetermined electrical potential by clamping the signal level in said signal interval $TH_D$, i.e., the optical black level, to a predetermined level with a clamp pulse, as shown in FIG. 2B, which occurs in said signal interval $TH_D$ during every horizontal scanning interval H.

In the solid-state image sensor consisting of a CCD (Charge Coupled Device) or the like, a light-receiving section corresponding to the picture elements is provided only for said effective picture area 2 and only a transfer resister for said ineffective picture area 3 is provided in order to obtain as many effective picture elements as possible. The output signal of the image pick-up obtained from the image pick-up section consisting of said solid-state image sensor, thus is subject to the influence of dark current only in the transfer register for the portion which corresponds to the ineffective picture area 3. The portion which corresponds to the effective picture area 2 is subject to the influence of dark currents in both the light-receiving section and the transfer register section. Particularly, a pronounced level variation occurs due to said dark current between the vertical blanking interval, during which no signal is read out, and the subsequent scanning interval.

Therefore, if the time constant of the clamp circuit is reduced so that it is possible to faithfully follow dark current changes in the solid-state image sensor output signal for each field or frame, low frequency noise components that are generated at the time of clamping will be increased which results in the formation of strips or noise for each line which extremely deteriorate the quality of reproduction. On the other hand, if the time constant of the clamp circuit is increased to reduce said low frequency noise components, sufficient compensation for the level variations generated between said vertical blanking interval and the subsequent scanning interval cannot be obtained, which has the disadvantage that flicker in the picture or brightness variations in the vertical direction of that picture result.

SUMMARY OF THE INVENTION

An object of the present invention is to prevent black level variations of the output signal of the image pick-up due to fluctuations of the dark current in the image pick-up device.

Another object of the present invention is to provide a clamp circuit, which permits even rapid changes in said dark current to be followed sufficiently and also permits an image pick-up output signal of satisfactory quality to be obtained by reducing the low frequency noise.

The above-mentioned and other objects and features of the invention will become apparent from the following detailed description taken in conjunction with the drawings which indicate an embodiment of the present invention.

DESCRIPTION OF THE PREFERRED EMBODIMENT

Figure 3:
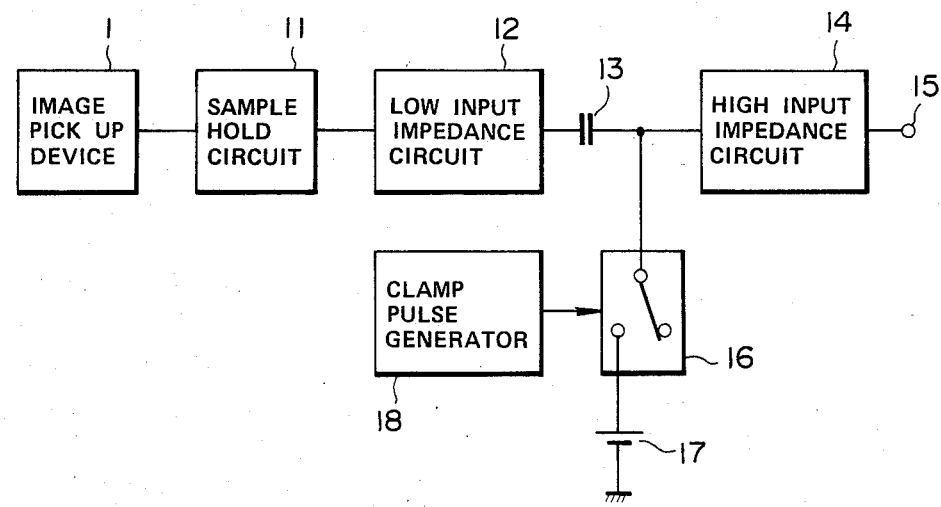
FIG. 3 is a block diagram showing an embodiment of the clamp circuit according to the present invention applied to an image pick-up device.

FIG. 3 is a block diagram showing an embodiment of the present invention applied to an image pick-up device.

Figure 1:
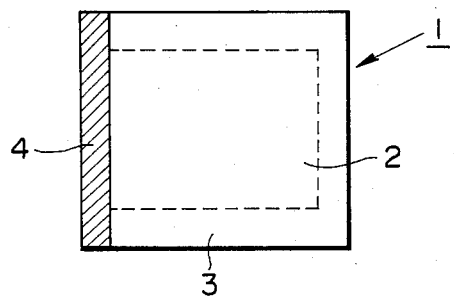
FIG. 1 is a schematic view showing an image pick-up section for producing an optical black level in the image pick-up output signal.
Figure 2:
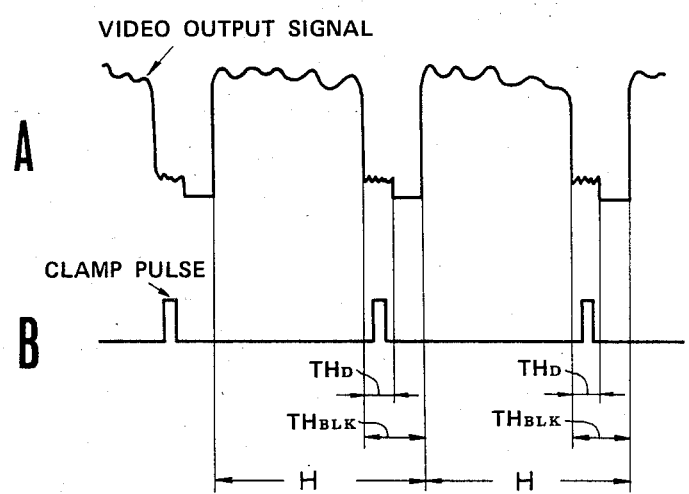
FIG. 2 is a waveform chart for explaining the operation of a prior art clamp circuit for clamping the optical black level of the image pick-up output signal.

The image pick-up device of the embodiment has the image pick-up section 1 as shown in FIG. 1, with the optical black-detecting portion 4 arranged as shown. The image pick-up section 1 consists of, for instance, an interline transfer type CCD image sensor.

The output signal of the image pick-up obtained from said image pick-up section 1 is supplied to a low impedance circuit 12 through a sample/hold circuit 11.

Figure 4:
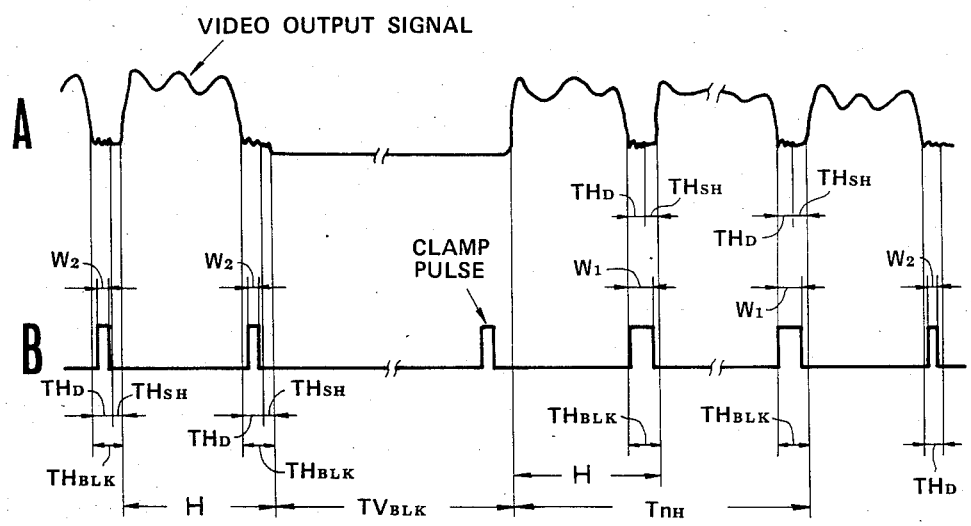
FIG. 4 is a waveform chart for explaining the clamping operation of the same embodiment.

The sample/hold circuit 11 samples the data level of the output signal of the image pick-up section 1 at the end of the signal interval $TH_D$ corresponding to the optical black detecting portion 4, and holds the sampled level during the interval $TH_{SH}$ until the end of the horizontal blanking interval $TH_{BLK}$. The image pick-up output signal, is shown in FIG. 4A, and from the sample/hold circuit 11 is supplied to a high input impedance 14 from said low input impedance circuit 12 through a clamping capacitor 13 and appears at an output terminal 15 of said high input impedance circuit 14. The connection point between said clamping capacitor 13 and the high input impedance circuit 14 is connected to a power source 17 through a clamp switch 16. The clamp switch 16 is on-off controlled for each horizontal scanning interval by a clamp pulse signal supplied from a clamp pulse generator 18 in the manner as described hereinafter.

The clamp pulse generator 18 generates a clamp pulse for each horizontal scanning interval H as shown in FIG. 4B. The clamp switch 16 is held closed while said clamp pulse output is at a high level. The pulse width of the clamp pulses provided for several horizontal scanning intervals $T_{nH}$ immediately after each vertical blanking interval of the image pick-up output has a value $W_1$ greater than the pulse width $W_2$ of the other clamp pulses within the horizontal blanking interval $TH_{BLK}$. The pulse width $W_2$ is provided within the signal interval $TH_D$ which corresponds to the optical black level of the image pick-up output signal.

With the embodiment having the construction as described, immediately after the vertical blanking interval $TV_{BLK}$, the output signal of the image pick-up section 1 is clamped by the wider clamp pulses having the pulse width $W_1$ which is covering the signal interval $TH_D$ which corresponds to the optical black level in the horizontal direction and the subsequent signal interval $TH_{SH}$. During such time the data level of the end of said signal interval $TH_D$ is held. That is, the time constant for the clamping action is increased to permit even a rapid change in the dark current level in said image pick-up section 1 to be accurately followed. Since the pulse width of said clamp pulses is increased to the value $W_1$ only for several horizontal scanning interval immediately after the vertical blanking interval $TV_{BLK}$ and is reset to the value $W_2$ for the subsequent pulses, it is possible to obtain accurate clamping only for the signal interval $TH_D$ which corresponds to the optical black level and thus to sufficiently suppress the low frequency noise.

The above embodiment of the present invention is concerned with an image pick-up device with the image pick-up section 1 which has an the optical black-detecting portion 4 on the left edge as illustrated in FIG. 1 but the present invention is not limited to such structure.

Figure 5:
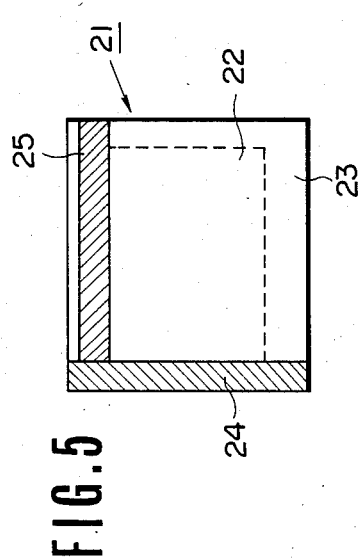
FIG. 5 is a schematic view showing a different example of an the image pick-up section of image pick-up device, to which the present invention is applied.

For example, the clamp circuit according to the present invention may be used for clamping the output signal of an image pick-up section 21 as shown in FIG. 5, which has optical black-detecting portions 24 and 25 provided in a ineffective picture areas 23 which surround the effective picture area 22 and extend respectively along the left edge and top relative to FIG. 5 and the horizontal and vertical blanking intervals of the output signal.

Figure 6:
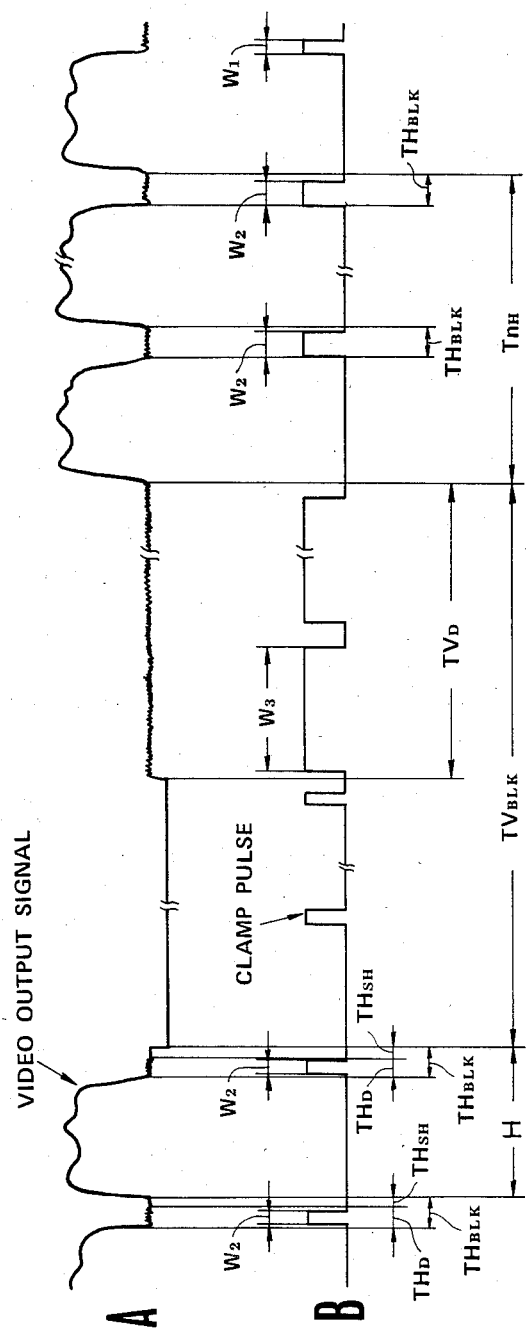
FIG. 6 is a waveform chart for explaining the clamping operation of the clamp circuit according to the present invention with respect to the output signal of the image pick-up section shown in FIG. 5.

In this case, the pulse width may be set to an increased value $W_3$, as shown in FIG. 6B, within the signal interval $TV_D$ which corresponds to the optical black-detecting portion 25 for the vertical blanking interval of the output signal of said image pick-up section 1, as shown in FIG. 6A, within said signal interval $TV_D$ for clamp pulses supplied during this interval. The clamp pulse output as shown in FIG. 6B may be generated from the clamp pulse generator 18 shown in FIG. 3.

What is claimed is:

1. A clamp circuit for use in a video camera which has an area for detecting pictures and which has a horizontal blanking interval and vertical blanking interval and which has an image pick-up device, said image pick-up device having a first optical black-detecting portion, which is mounted outside said area for detecting pictures, said clamp circuit receiving said output signal from said image pick-up device, and comprising:
   a clamp switch operated at a horizontal scanning frequency and receiving said output signal from said image pick-up device;
   a clamp voltage source connected to said clamp switch to operate it so as to clamp said output signal to a level equal to the voltage supplied by said clamp voltage source; and
   a clamp pulse generating means for generating a train of clamp pulses and controlling said clamp switch, the pulse width of at least one of said clamp pulses which is supplied immediately after said vertical blanking interval being greater than that of clamp pulses which are not supplied immediately after said vertical blanking interval.

2. A clamp circuit according to claim 1, wherein said pulse width of said clamp pulse supplied immediately after the vertical blanking interval is within the horizontal blanking interval.

3. A clamp circuit according to claim 2, wherein said image pick-up device is a solid state image sensor.

4. A clamp circuit according to claim 1, wherein said image pick-up device further has a second optical black-detecting portion which is mounted outside said area for detecting pictures and is arranged normal to said first optical black-detecting portion.

5. A clamp circuit according to claim 4, wherein the pulse widths of clamp pulses occurring during said vertical blanking interval are greater than that said clamp pulse supplied immediately after the vertical blanking interval.

6. A clamp circuit according to claim 5, wherein the pulse widths of clamp pulses supplied during the vertical blanking interval are substantially equal to the horizontal trace interval.

* * * * *